United States Patent [19]

Sawamura

[11] Patent Number: 4,487,734

[45] Date of Patent: Dec. 11, 1984

[54] METHOD FOR THE PREPARATION OF A HIGH DENSITY SINTERED BODY OF SILICON CARBIDE

[75] Inventor: Kentaro Sawamura, Ichikawa, Japan

[73] Assignee: TDK Corporation, Tokyo, Japan

[21] Appl. No.: 517,373

[22] Filed: Jul. 26, 1983

[30] Foreign Application Priority Data

May 10, 1983 [JP] Japan ................................. 58-81563

[51] Int. Cl.$^3$ ...................... C04B 33/34; C04B 33/36
[52] U.S. Cl. ....................................... 264/61; 264/63; 264/65; 501/89; 501/92
[58] Field of Search ............... 501/88, 89, 92; 264/61, 264/63, 65

[56] References Cited

U.S. PATENT DOCUMENTS

| 3,947,550 | 3/1976 | Fitchmun | 501/88 |
| 4,336,216 | 6/1982 | Watanabe | 264/65 |
| 4,354,991 | 10/1982 | Suzuki | 264/65 |

*Primary Examiner*—John A. Parrish
*Attorney, Agent, or Firm*—Wyatt, Gerber, Shoup, Scobie and Badie

[57] ABSTRACT

A sintered body of silicon carbide having an outstandingly high density is readily obtained by sintering a shaped form of a powdery blend composed of a silicon carbide powder, an aluminum borate as a sintering aid and a carbonizable organic compound mixed together in a limited proportion.

8 Claims, No Drawings

METHOD FOR THE PREPARATION OF A HIGH DENSITY SINTERED BODY OF SILICON CARBIDE

BACKGROUND OF THE INVENTION

The present invention relates to a method for the preparation of a high density sintered body of silicon carbide or, more particularly, to a method for the preparation of a high density sintered body of silicon carbide by use of a specific sintering aid as well as a sintered body of silicon carbide prepared by the method.

As is well known, sintered bodies of silicon carbide are very promising as a refractory material having excellent oxidation resistance, corrosion resistance, heat-shock resistance and mechanical strengths, in particular, at high temperatures so that they are used as a high-temperature structural body, anti-abrasion material, friction member and the like.

Sintered bodies of silicon carbide are usually prepared by admixing powdery silicon carbide with a sintering aid and a binder followed by shaping and sintering at an elevated temperature. Selection of the sintering aid is very important in order to obtain sintered bodies of silicon carbide having satisfactory properties or, in particular, high density. For example, boron carbide is the most widely used sintering aid but the extremely high hardness of this material causes considerable difficulties in pulverizing the material into fine particles to present a serious problem in the industrial production of silicon carbide sintered bodies. With an object to overcome this problem, a method has been proposed in which boron oxide, capable of being converted into boron carbide in the sintering process, is used as the sintering aid in place of boron carbide by utilizing the pulverizability inherent to boron oxide. Unfortunately, however, the boiling point of boron oxide is relatively low at 1860° C. so that a part of the boron oxide admixed with silicon carbide is lost by dissipation before the sintering temperature is reached and the desired effect of sintering aid can not always be obtained.

On the other hand, it is known that aluminum and aluminum compounds may serve as a sintering aid for silicon carbide. Metallic aluminum in a finely pulverized form, however, is disadvantageous because it is highly pyrophoric and must be handled with utmost carefulness in addition to the low dispersibility not to ensure uniform dispersion in the silicon carbide powder due to agglomeration readily taking place in aluminum powders. As to the aluminum compounds as a sintering aid, few of the compounds are sufficiently active as themselves. Moreover, sulfate and nitrate of aluminum capable of giving active aluminum oxide have a problem that toxic gases are produced in the course of sintering in the form of sulfur oxides or nitrogen oxides while aluminum-containing organic compounds such as aluminum isopropoxide, aluminum citrate, aluminum monostearate and the like must be used in a relatively large amount in order to give a sufficient amount of alumina due to the low content of aluminum therein so that the shaped body under sintering is subject to a great shrinkage in volume due to the decomposition of the aluminum compound in the course of sintering and the sintered bodies obtained therewith cannot be dense enough.

Thus, none of the conventionally used sintering aids for silicon carbide is satisfactory when high-density sintered bodies of silicon carbide are desired.

SUMMARY OF THE INVENTION

An object of the present invention is therefore to provide a high-density sintered body of silicon carbide by use of a novel sintering aid which is handled easily and freed from the disadvantages in the conventional sintering aids. The sintering aid discovered as a result of the extensive investigations undertaken by the inventor is an aluminum borate and very satisfactory results can be obtained by the use of this particular sintering aid in the sintering of silicon carbide.

Thus, the method of the present invention for the preparation of a high-density sintered body of silicon carbide comprises admixing 100 parts by weight of a silicon carbide powder with from 0.1 to 20 parts by weight of an aluminum borate in a powdery form and a carbonizable organic compound in an amount capable of giving from 1 to 15 parts by weight of residual carbon after pyrolysis to give a powdery blend, shaping the powdery blend into a form and sintering the thus shaped form of the powdery blend.

DETAILED DESCRIPTION OF THE PREFERRED EMBODIMENTS

In the first place, each of the individual components to form the powdery blend above mentioned is described in detail.

The base component used in the inventive method is of course silicon carbide and the silicon carbide may be either the non-cubic $\alpha$-silicon carbide or the cubic $\beta$-silicon carbide in its crystalline form. The average particle size of the silicon carbide should be as fine as possible and usually it is 20 $\mu$m or smaller or, preferably, 10 $\mu$m or smaller by undertaking a suitable pulverization means.

The sintering aid admixed with the silicon carbide powder is an aluminum borate which may be widely different in the stoichiometric composition including not only those having a composition of $Al_2O_3 \cdot B_2O_3$ but also those having a composition of $2Al_2O_3 \cdot B_2O_3 \cdot 5H_2O$ to $9Al_2O_3 \cdot 2B_2O_3$. At any rate, the sintering aid should be in the form of a composite oxide of $Al_2O_3$ and $B_2O_3$ and no desired effect can be obtained by the combined use of the single oxides of $Al_2O_3$ and $B_2O_3$ as the components of the aluminum borate. The amount of the aluminum borate should be in the range from 0.1 to 20 parts by weight per 100 parts by weight of the silicon carbide powder. When the amount is smaller than the lower limit of the above range, no sufficient accelerating effect of sintering can be obtained. On the other hand, too much of the sintering aid is undesirable because of the adverse effects on the excellent properties inherent to the sintered body of silicon carbide as well as decrease in the density and mechanical strength of the sintered body.

The aluminum borate as the sintering aid also should have a particle size distribution as fine as possible and the average particle diameter thereof should be 20 $\mu$m or smaller or, preferably, 10 $\mu$m or smaller.

The aluminum borate used as the sintering aid in the inventive method has good pulverizability and the powder can be imparted easily with a desired average particle diameter. In addition, powders of aluminum borate characteristically have good dispersibility in the silicon carbide powder to give a uniform powdery blend so that the structure of the sintered body of the powdery blend is also very uniform and dense. Moreover, aluminum borates have much larger stability than boric acid used as such and can be readily decomposed into highly active boron oxide and aluminum oxide at a temperature well below the sintering temperature wighout being lost by dissipation so that sintering of the silicon carbide powder is greatly accelerated.

The carbonizable organic compound, i.e. an organic compound capable of producing free carbon by pyrolysis, used in the inventive method in combination with the aluminum borate may be liquid or solid and is exemplified by liquid and solid phenolic resins, coal tar pitches, petroleum pitches, heavy oils and the like. When the carbonizable organic compound is solid, it should be in a powdery form as fine as possible or, preferably, dissolved or dispersed in a liquid organic material, e.g. organic solvents, in order to facilitate uniform mixing with the other components. The amount of the carbonizable organic compound in the powdery blend with the silicon carbide powder and the aluminum borate powder is usually in such a range that the pyrolysis thereof in the course of sintering gives from 1 to 15 parts by weight of residual carbon per 100 parts by weight of the silicon carbide powder. Although the above mentioned amount of the carbonizable organic compound is somewhat too large for a mere binder, it has been established in consideration of the role played by the component to reduce not only the silicon dioxide film on the silicon carbide particles, which is considered to have a retarding effect on the sintering of the silicon carbide particles, but also the aluminum oxide and boron oxide as the constituents of the aluminum borate. Accordingly, no sufficient effect of sintering acceleration can be obtained when the amount thereof is smaller than above even by the addition of a sufficient amount of the aluminum borate while the amount thereof should not exceed the above given range because of the adverse effect on the properties of the sintered body inherent to silicon carbide as a result of the increased amount of free carbon in the sintered body.

In practicing the inventive method, the silicon carbide powder is admixed with necessary amounts of an aluminum borate and a carbonizable organic compound and further, according to need, with a binder such as polyvinyl alcohol and thoroughly mixed together in a suitable mixer-pulverizer such as a ball mill into a uniform powdery blend. The powdery blend is then shaped into a desired form by a suitable shaping method such as extrusion molding, injection molding, casting and the like. In this case, it is preferable in order to obtain a sintered body having a high density that the powdery blend is subjected to compression under a pressure in the range from 200 to 2000 kg/cm$^2$. The thus obtained shaped body is then subjected to sintering at a temperature in the range from 1700° to 2300° C. in an atmosphere of an inert gas, such as nitrogen, argon, neon, helium, carbon dioxide and the like, or a reducing gas, such as hydrogen, carbon monoxide and the like. The length of time for the sintering is not particularly limitative but it is usually in the range from 10 to 60 minutes.

The sintered body of silicon carbide obtained in this manner has a density as high as 3.00 g/cm$^3$ or larger and is imparted with excellent mechanical strength and heat-shock resistance so that it is useful as a material for mechanical seal, friction material, abrasion-resistant material, structural material for high temperature use, heater element, heat exchanger body and the like.

In the following, the method of the present invention is illustrated in further detail by way of examples.

EXAMPLE 1

A powdery blend was prepared by uniformly mixing 100 parts by weight of a powder of α-silicon carbide having an average particle diameter of about 0.5 μm with 1.5 parts by weight of aluminum borate $Al_2O_3$.-$B_2O_3$ in a powdery form having a maximum particle diameter of 10 μm with an average of 3 to 4 μm and 15 parts by weight of a liquid phenolic prepolymer having a residual carbon ratio of 50% in a ball mill and the powdery blend was shaped into a plate by compression molding under a pressure of 1000 kg/cm$^2$ followed by drying.

The thus shaped body was put into an electric furnace and sintered in an atmosphere of argon for 30 minutes at 2050° C. into a sintered body of silicon carbide having a density of 3.19 g/cm$^3$.

For comparison, the same procedure as above was repeated except that the amount of the aluminum borate was reduced to 0.05 part by weight. The density of the sintered body obtained in this case was only 2.25 g/cm$^3$.

EXAMPLE 2

A powdery blend was prepared by uniformly mixing 100 parts by weight of a powder of β-silicon carbide having an average particle diameter of about 0.7 μm with 18 parts by weight of a powdery aluminum borate having a composition of $9Al_2O_3.2B_2O_3$ with an average particle diameter of 3 to 4 μm and 20 parts by weight of a liquid phenolic prepolymer having a residual carbon ratio of 50% and the powdery blend was shaped by compression molding under a pressure of 1000 kg/cm$^2$.

The shaped body was sintered in an atmosphere of argon for 20 minutes at 1950° C. into a sintered body of silicon carbide having a density of 3.20 g/cm$^3$.

For comparison, the same procedure as above was repeated except that the amount of the aluminum borate was increased to 25 parts by weight to give a sintered body of silicon carbide having a density of 2.97 g/cm$^3$.

COMPARATIVE EXAMPLE

A powdery blend was prepared by uniformly mixing 100 parts by weight of the same powdery α-silicon carbide as used in Example 1 with 1.5 parts by weight of an equimolar mixture of aluminum oxide $Al_2O_3$ and boron oxide $B_2O_3$ and 15 parts by weight of the same liquid phenolic prepolymer as used in Example 1 and the powdery blend was shaped and sintered under the same conditions as in Example 1.

The sintered body of silicon carbide obtained in this manner had a density of 2.85 g/cm$^3$. As is clear from this result, the combined but separate addition of the single oxides of aluminum oxide and boron oxide is not effective to give a sufficiently high density to the sintered body of silicon carbide.

What is claimed is:

1. A method for the preparation of a high-density sintered body of silicon carbide which comprises admixing 100 parts by weight of a silicon carbide powder with from 0.1 to 20 parts by weight of an aluminum borate in a powdery form and a carbonizable organic compound in an amount capable of giving from 1 to 15 parts by weight of residual carbon after pyrolysis to give a powdery blend, shaping the powdery blend into a form and sintering the thus shaped form of the powdery blend.

2. The method as claimed in claim 1 wherein the silicon carbide powder has an average particle diameter not exceeding 20 μm.

3. The method as claimed in claim 1 wherein the aluminum borate has an average particle diameter not exceeding 20 μm.

4. The method as claimed in claim 1 wherein the carbonizable organic compound is selected from the group consisting of liquid and solid phenolic resins, coal tar pitches, petroleum pitches and heavy oils.

5. The method as claimed in claim 1 wherein the shaping of the powdery blend into a form is performed by compression under a pressure in the range from 200 to 2000 kg/cm$^2$.

6. The method as claimed in claim 1 wherein the sintering of the shaped form is performed at a temperature in the range from 1700° to 2300° C. for 10 to 60 minutes.

7. The method as claimed in claim 1 wherein the sintering of the shaped form is performed in an atmosphere of an inert gas or a reducing gas.

8. A high-density sintered body of silicon carbide prepared by sintering a shaped form of a powdery blend composed of 100 parts by weight of a silicon carbide powder, from 0.1 to 20 parts by weight of an aluminum borate in a powdery form and a carbonizable organic compound in an amount capable of giving from 1 to 15 parts by weight of residual carbon after pyrolysis.

* * * * *